US012799434B2

(12) United States Patent
Zhao et al.

(10) Patent No.: US 12,799,434 B2
(45) Date of Patent: Nov. 17, 2026

(54) PEONY BARK ESSENTIAL OIL SILICA NANOPARTICLES AND PREPARATION METHOD AND APPLICATION THEREOF

(71) Applicant: Wannan Medical College, Wuhu City (CN)

(72) Inventors: Jinhong Zhao, Wuhu City (CN); Yuanyuan Li, Wuhu City (CN); Xiangzi Li, Wuhu City (CN); Qiao Teng, Wuhu City (CN); Hongming Zhou, Wuhu City (CN); Guoxin Wu, Wuhu City (CN)

(73) Assignee: WANNAN MEDICAL COLLEGE, Wuhu (CN)

( * ) Notice: Subject to any disclaimer, the term of this patent is extended or adjusted under 35 U.S.C. 154(b) by 246 days.

(21) Appl. No.: 18/756,972

(22) Filed: Jun. 27, 2024

(65) Prior Publication Data

US 2025/0019620 A1 Jan. 16, 2025

Related U.S. Application Data

(63) Continuation-in-part of application No. PCT/CN2024/082730, filed on Mar. 20, 2024.

(30) Foreign Application Priority Data

Jul. 11, 2023 (CN) ......................... 202310847762.4

(51) Int. Cl.

| | |
|---|---|
| ***C11D 3/00*** | (2006.01) |
| ***C11D 3/12*** | (2006.01) |
| ***C11D 3/382*** | (2006.01) |
| ***C11D 3/48*** | (2006.01) |

(52) U.S. Cl.

CPC .............. *C11D 3/382* (2013.01); *C11D 3/124* (2013.01); *C11D 3/48* (2013.01); *C11D 2111/12* (2024.01)

(58) Field of Classification Search

CPC ........... C11D 3/382; C11D 3/124; C11D 3/48; C11D 2111/12; C11D 1/75

USPC .......................................................... 510/462

See application file for complete search history.

(56) References Cited

FOREIGN PATENT DOCUMENTS

| | | | | | |
|---|---|---|---|---|---|
| CN | 110105741 A | | 8/2019 | |
| CN | 113150397 A | * | 7/2021 | ................ C08J 5/18 |
| CN | 113615717 A | * | 11/2021 | ............. A01N 65/44 |
| CN | 115491268 A | * | 12/2022 | ........... C11D 3/2068 |

* cited by examiner

*Primary Examiner* — Eisa B Elhilo

(74) *Attorney, Agent, or Firm* — Nitin Kaushik

(57) ABSTRACT

The disclosure discloses peony bark essential oil silica nanoparticles and a preparation method and application thereof. The peony bark essential oil silica nanoparticles of the disclosure are prepared from mesoporous silica, peony bark essential oil, and chloroform in a solid-liquid ratio of 90-110 mg:50-150 μL:0.5-2 mL. In the disclosure, the peony bark essential oil is used as a main active ingredient, and the peony bark essential oil is loaded into mesoporous silica particles to prepare the peony bark essential oil silica nanoparticles. The peony bark essential oil silica nanoparticles are uniform in size, high in coating efficiency, and good in release performance. The mesoporous silica prepared in the disclosure may be effectively compatible with the peony bark essential oil, and may effectively improve an anti-mite effect of the peony bark essential oil while achieving slow release of the peony bark essential oil.

9 Claims, 12 Drawing Sheets

PEONY BARK ESSENTIAL OIL SILICA NANOPARTICLES AND PREPARATION METHOD AND APPLICATION THEREOF

CROSS REFERENCE TO RELATED APPLICATIONS

This application is a Continuation-in-Part of International Application No. PCT/CN2024/082730, filed on Mar. 20, 2024, which claims priority of Application No. 2023108477624 filed in China on Jul. 11, 2023 under 35 U.S.C. § 119; the entire contents of all of which are hereby incorporated by reference.

TECHNICAL FIELD

The disclosure relates to a method for immobilizing peony bark essential oil, and in particular, relates to peony bark essential oil silica nanoparticles, a preparation method thereof, and application thereof in preparation of daily chemical products with an anti-mite function, such as anti-mite laundry detergents, anti-mite sprays, anti-mite personal care products, and anti-mite incense.

BACKGROUND

Dermatophagoides farinae are a group of house mites that are commonly found in indoor environments where humans live and work, for example, in house dust and dust on surfaces of mattresses, especially in rooms with high humidity, and they are main members of house mites. Common breeding objects include grain scraps, animal dander, bedding, sweaters, cotton-padded clothes, carpets, and the like. Dermatophagoides farinae feed on animal shed dander and are often found on the bedding and clothing of asthma patients. Dermatophagoides farinae are one of main sources of mite allergens. The secretions, excretions, and degradation products after death of dermatophagoides farinae may all become allergens, and may induce IgE-mediated allergic reactions, causing allergic diseases such as allergic asthma, allergic rhinitis, and urticaria. Epidemiological investigations have further confirmed that dermatophagoides farinae are important allergens causing allergic diseases. According to reports, about 60% to 80% of allergic disease patients are allergic to dermatophagoides farinae. At present, main measures for controlling pest mites are traditional chemical agents such as spirodiclofen and etoxazole. However, long-term heavy and improper use of chemical agents may lead to a series of negative effects, such as decrease in the number of natural enemies, susceptibility to drug resistance, environmental pollution, and harm to human health. Therefore, it has become an important research direction to find a new, efficient, and safe acaricide. Botanical pesticides have the advantages such as broad spectrum, low toxicity, and safety, providing an idea for the development of botanical acaricides, and the development of the botanical acaricides has far-reaching significance.

As a botanical pesticide, essential oil has the advantages such as high efficiency, low toxicity, and low drug resistance compared to traditional chemical reagents. Essential oil is also considered a promising alternative to pest control. However, essential oil also has some limitations, such as instability and low solubility. Therefore, there is an urgent need to improve the performance of plant volatile oil and develop safe and efficient new preparation forms.

Peony bark is the dry root bark of the Ranunculaceae plant peony, and has uses in antioxidation, anti-inflammation, neuroprotection, cardiovascular protection, and the like. The main active ingredient of peony bark is paeonol. Previous studies have confirmed that a peony bark extract has high acaricidal activity against dermatophagoides farinae and dermatophagoides pteronyssinus adults. In addition, there have been reports on the antifungal and acaricidal activities of the peony bark extract, but there have no reports on how to achieve immobilization preparation of the peony bark extract to improve the performance thereof.

In the prior art, essential oil is loaded onto porous silica nanomaterials to achieve slow release of the essential oil. For example, Chinese patent CN110105741A has disclosed a silica composite material with an essential oil slow-release function and a preparation method thereof, where the composite material uses hollow silica nanotubes as carriers for storage and slow release of essential oil, and the essential oil slowly volatilizes into an external environment through two ends of the nanotubes; and in the composite material, a silane coupling agent is used as a coupling agent for efficiently modifying silica, and a polymer containing propenyl functional groups is used as a crosslinking agent for shaping a powder material into a solid block material. The composite material has a good essential oil slow-release effect, and may effectively prolong the fragrance retention time and improve the use efficiency of the essential oil. Meanwhile, the composite material has a good protective effect on the essential oil and effectively reduces the influence of external light, heat, oxygen and other factors on the essential oil. However, when a silica nanomaterial is used as the carrier for essential oil, the difference in slow-release effects on different essential oils is large. When a release rate of essential oil is too low, a working concentration of the essential oil may be hard to reach in a working environment, resulting in failure of the essential oil. Therefore, it is difficult to predict whether the original efficacy of essential oil can be maintained when the essential oil is loaded by silica nanomaterials.

SUMMARY

Objectives of the disclosure: one objective of the disclosure is to provide a method for preparing peony bark essential oil silica nanoparticles to solve the problem of immobilization preparation of the peony bark essential oil. Another objective of the disclosure is to provide application of the peony bark essential oil silica nanoparticles in preparation of an anti-mite product to solve the problem of how to use the peony bark essential oil silica nanoparticles to prepare the anti-mite product.

Technical solution: the preparation method of peony bark essential oil silica nanoparticles provided by the disclosure includes the following steps:

(1) mixing mesoporous silica, peony bark essential oil, and chloroform to obtain a mixture;
(2) vibrating the mixture with ultrasound and allowing the mixture to stand until the mixture completely dehydrates; and
(3) repeating step (1) and step (2) to obtain the peony bark essential oil silica nanoparticles.

Preferably, in step (1), a solid-liquid ratio of the mesoporous silica to the peony bark essential oil to the chloroform is 90-110 mg:50-150 μL:0.5-2 mL. The solid-liquid ratio is preferably (95-105 mg:80-120 μL:1-1.5 mL, further preferably 100 mg:100 μL:1.2 mL.

In the disclosure, a preparation method of the peony bark essential oil is as follows: grinding dry peony bark into powder using a grinder, and sieving the powder with a 30-50 mesh screen to remove impurities to obtain peony bark powder; mixing the peony bark powder with distilled water in a mass volume ratio of 90-110 g:700-900 mL; extracting the mixture by steam distillation until the extract is clear to obtain an extract solution; repeatedly extracting the extract solution with ether 2-4 times, and mixing the respective filtrates to obtain a total filtrate; drying the total filtrate with anhydrous sodium sulfate to obtain the peony bark essential oil; and sealing and storing the peony bark essential oil at 4 °C in a brown glass bottle for later use.

Preferably, a preparation method of the mesoporous silica is as follows:

(1) mixing ethanol, ammonium hydroxide, tetraethyl orthosilicate, and a hexadecyl trimethyl ammonium bromide aqueous solution to obtain a mixed solution;

(2) centrifuging the mixed solution and taking a precipitate to obtain a solid; and (3) calcining the solid to obtain the mesoporous silica.

Preferably, in step (1), the ethanol is an ethanol aqueous solution with a concentration of 60-80 vt %, and the hexadecyl trimethyl ammonium bromide aqueous solution is prepared by mixing hexadecyl trimethyl ammonium bromide with water in a mass volume ratio of 2-3 g:40-60 mL. In some examples, the ethanol concentration is preferably 70 vt %. The mass volume ratio of the hexadecyl trimethyl ammonium bromide to the water is preferably 2.5 g:50 mL.

Preferably, in step (1), a volume ratio of the ethanol to the ammonium hydroxide to the hexadecyl trimethyl ammonium bromide aqueous solution is 40-60:10-15:40-60, preferably 50:12.5:50; and a mass volume ratio of the tetraethyl orthosilicate to the hexadecyl trimethyl ammonium bromide aqueous solution is 3-4 g:40-60 mL, preferably 3.5 g 50 mL.

Preferably, in step (2), the centrifugal speed is 12000-18000 rpm and the centrifugal time is 15-25 min, preferably 15000 rpm and 20 min; and in step (3), the calcination temperature is 500-600 °C and the calcination time is 5-7 h, preferably calcination at 550 °C for 6 h.

Preferably, in step (2), the standing temperature is 20-25 °C, preferably 22.5 °C; and in step (3), the number of repetitions is 2-4.

The disclosure further applies the peony bark essential oil silica nanoparticles prepared by the above method to preparation of an anti-mite product. The anti-mite product may be an anti-mite laundry detergent, an anti-mite spray, an anti-mite personal care product, anti-mite incense, and other daily necessity with an anti-mite function.

Preferably, the anti-mite product is an anti-mite laundry detergent, and the anti-mite laundry detergent includes the following components in parts by weight:

5-15 parts of the peony bark essential oil silica nanoparticles, 1-3 parts of an amino acid surfactant, 7-10 parts of an anionic surfactant, 3-5 parts of an amphoteric surfactant, 10-20 parts of a non-ionic surfactant, 8-11 parts of additives, and 36-66 parts of water.

Preferably, the amino acid surfactant is lauroyl sarcosinate and/or lauroyl glycinate; the anionic surfactant is one or more of sodium alcohol ether sulphate, sodium ethoxylated alkyl sulfate, and lauryl sulfate; the amphoteric surfactant is cocoamidopropyl betaine; the non-ionic surfactant is alkyl glucoside and/or coconut diethanolamide; the additives include a thickener, an antifreeze agent, an anti-redeposition agent, a chelating agent, a preservative, and a pH regulator; the thickener is guar gum; the antifreeze agent is propylene glycol; the anti-redeposition agent is polyacrylate; the chelating agent is tetra glutamate diacetate; the preservative is one or more of Casson DL501, Casson DL605, and Casson DL606; the pH regulator is sodium citrate; and an addition ratio of the thickener to the antifreeze agent to the anti-redeposition agent to the chelating agent to the preservative to the pH regulator is 0.1-4:0.5-4:0.2-4:0.2-2.4:0.1-0.5:0-3, and the ratio is preferably 1.1-3:1.5-3:1.5-3:1-1.6:0.2-0.4:1-2, more preferably 2.2:2.3:2.1:1.3:0.3:1.5.

Preferably, a preparation method of the anti-mite laundry detergent includes the following steps:

step 1: mixing the anionic surfactant, the amphoteric surfactant, the non-ionic surfactant, and ½ to ⅚ of the total amount of water at 45-50 °C to obtain a mixture A after cooling to 15-25 °C; in this step, the mixing temperature is preferably 47.5 °C, the cooling temperature is preferably 20 °C, and the proportion of the total amount of water is preferably ⅔;

step 2: mixing the peony bark essential oil silica nanoparticles, the additives, ⅙ to ½ of the total amount of water, the mixture A, and the amino acid surfactant to obtain a mixture B; in this step, the proportion of the total amount of water is preferably ⅓; and step 3: regulating pH of the mixture B to 6-8 to obtain the anti-mite laundry detergent, where the pH is preferably 7.0.

Beneficial effects: compared with the prior art, the disclosure has the following significant advantages: in the disclosure, the peony bark essential oil is used as a main active ingredient, and the peony bark essential oil is loaded into the mesoporous silica particles to prepare the peony bark essential oil silica nanoparticles. The peony bark essential oil silica nanoparticles are uniform in size, high in coating efficiency, and good in release performance. The situation that the silica nanoparticles reduce the efficacy of the peony bark essential oil is avoided. The mesoporous silica prepared in the disclosure may be effectively compatible with the peony bark essential oil, and may effectively improve an anti-mite effect of the peony bark essential oil while achieving slow release of the peony bark essential oil.

In the disclosure, the peony bark essential oil silica nanoparticles are applied to the anti-mite product, and may reduce the addition amount of essential oil in the anti-mite laundry detergent while prolonging the action time of the essential oil.

DETAILED DESCRIPTION

The technical solutions of the disclosure will be further described below in conjunction with the accompanying drawings.

Figure 1:
FIG. 1 shows peony bark essential oil prepared in the disclosure.

Example 1: A Preparation Method of Peony Bark Essential Oil Silica Nanoparticles (1) Peony bark essential oil was prepared by the following method:

Dry peony bark was ground into powder using a grinder, and the powder was sieved with a 40-mesh screen to remove impurities to obtain peony bark powder. 100 g of the peony bark powder was weighed and 800 mL of distilled water was added to the peony bark powder. The mixture was extracted by steam distillation until the extract was clear to obtain an extract solution. The extract solution was repeatedly extracted with ether for 3 times, and 3 filtrates were mixed to obtain a total filtrate. The total filtrate was dried with anhydrous sodium sulfate to obtain the peony bark essential oil. The peony bark essential oil was sealed and stored at 4 °C in a brown glass bottle for later use. The peony bark essential oil is shown in FIG. 1. From FIG. 1, it can be seen that the peony bark essential oil is crystal clear and transparent, free from contamination of other solvent, and has no impurities.

(2) Mesoporous silica was prepared by the following method:

2.1 Hexadecyl trimethyl ammonium bromide and water were mixed in a mass volume ratio of 2.4 g:50 mL to obtain a hexadecyl trimethyl ammonium bromide aqueous solution.

2.2 50 ml of 70% ethanol and 12 mL of ammonium hydroxide were added to 50 ml of the hexadecyl trimethyl ammonium bromide aqueous solution and stirred for 10 min. Then 3.4 g of tetraethyl orthosilicate was added and stirred for 2 h to obtain a mixed solution.

2.3 The mixed solution was centrifuged at 15000 rpm for 20 min to obtain a precipitate, and the precipitate was washed with 70% ethanol and deionized water respectively to obtain a solid.

Figure 2:
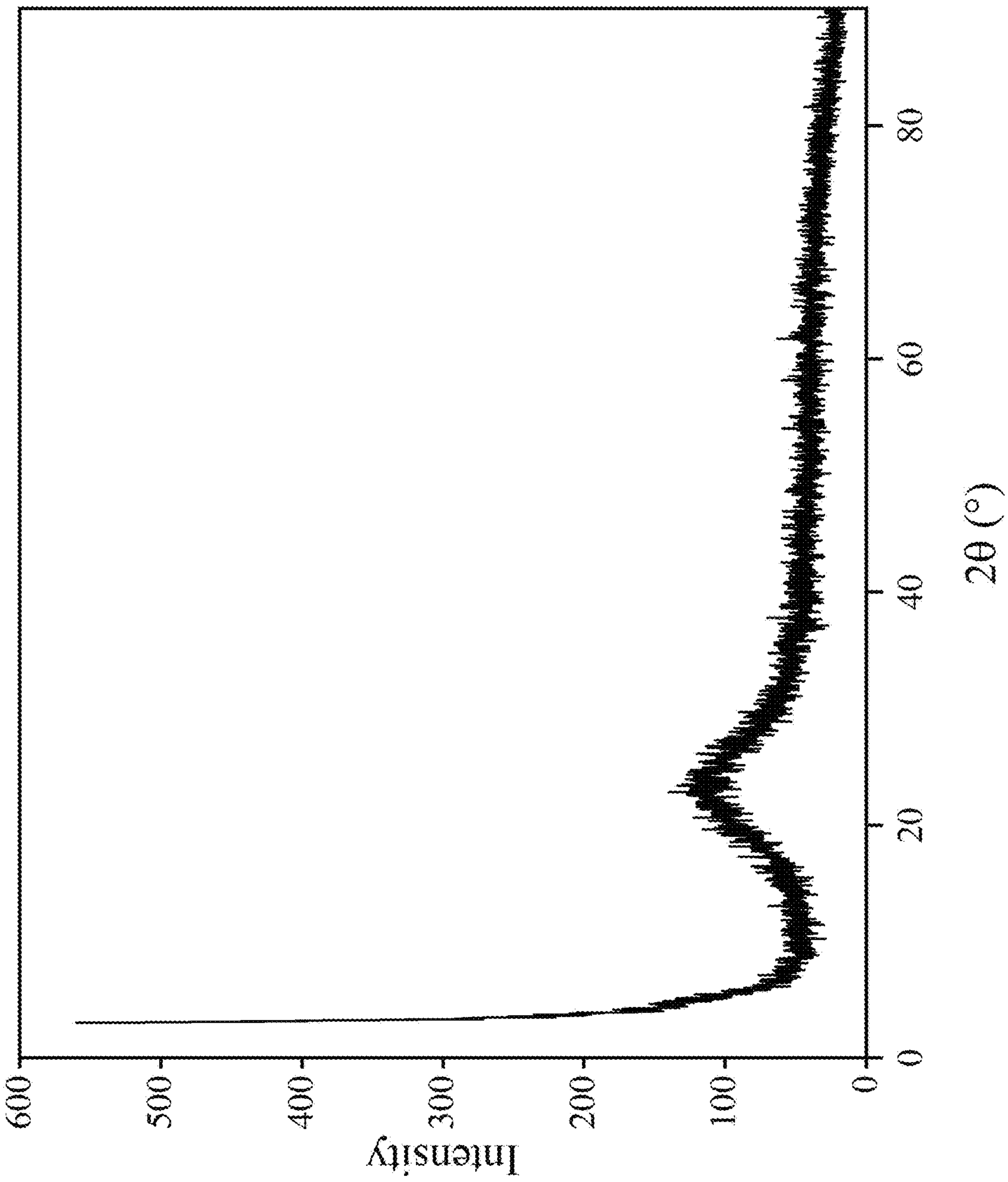
FIG. 2 shows a diffraction pattern of mesoporous silica.

2.4 The solid was calcined at 550 °C for 6 h to obtain the mesoporous silica. An internal structure of the mesoporous silica was analyzed and a diffraction pattern (as shown in FIG. 2) was obtained by detecting the mesoporous silica with an X-ray diffractometer. Parameters of the X-ray diffractometer were set as follows: the operating voltage was 40 kV and 30 mA, the scanning range was 35° to 85°, the diffraction angle was 20, and the step size was 0.02°. As shown in FIG. 2, there is a broad diffuse band at 15-35° 20, the broad peak is a characteristic peak of amorphous materials, and the waveform and position of the broad wave preliminarily prove that the material composition is silica.

(3) Peony bark essential oil silica nanoparticles were prepared by the following method:

3.1 100 mg of the mesoporous silica prepared in step (2), 100 μl of the peony bark essential oil prepared in step (1), and 1 mL of chloroform were mixed to obtain a mixture.

3.2 The mixture was vibrated with ultrasound for 20 min and allowed to stand at 25 °C until the mixture completely dehydrated.

3.3 Step 3.1 and step 3.2 were repeated for 3 times to obtain the peony bark essential oil silica nanoparticles.

Performance testing and analysis of the peony bark essential oil silica nanoparticles:

Experiment 1: Analysis on Particle Size and Structure of the Peony Bark Essential Oil Silica Nanoparticles A layer of gold was applied to surfaces of the peony bark essential oil silica nanoparticles prepared in Example 1 to prepare samples, and then the samples were scanned with a scanning electron microscope (SEM) to analyze the structure of the peony bark essential oil silica nanoparticles.

Figure 3:
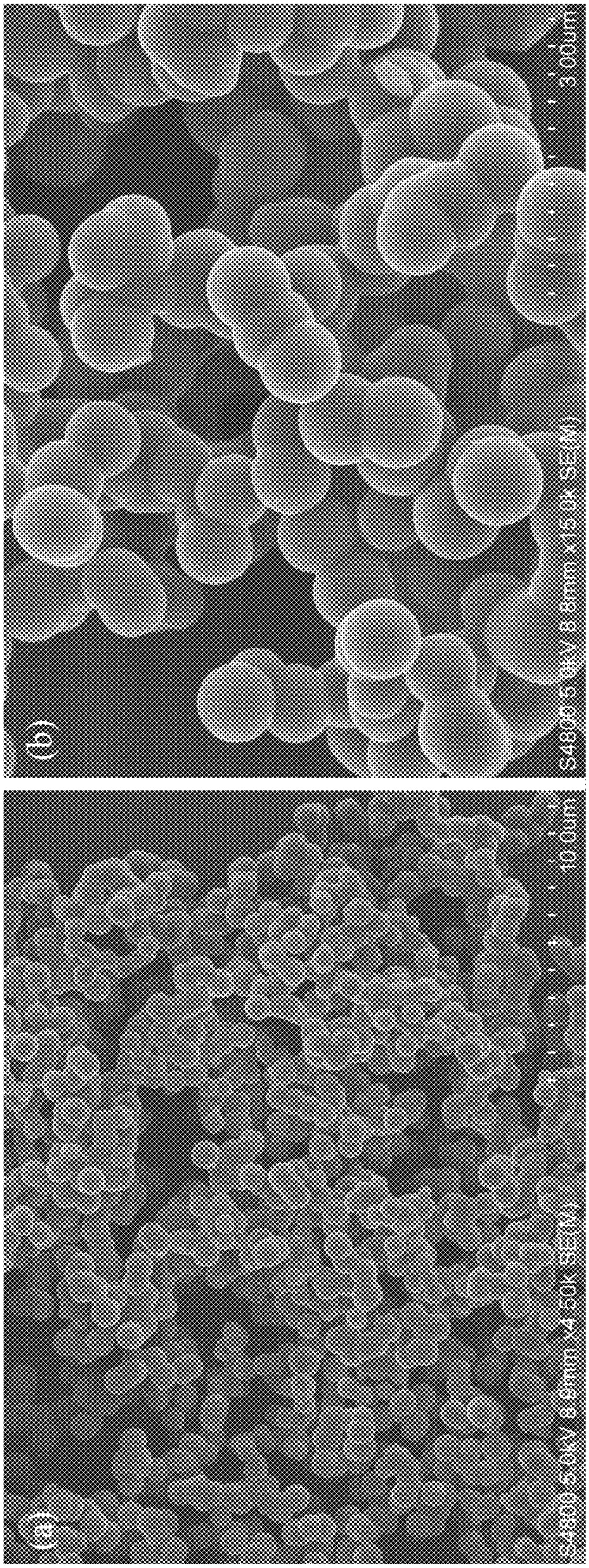
FIG. 3 shows scanning electron microscopy images of peony bark essential oil silica nanoparticles at different magnifications.

Scanning electron microscopy images of the peony bark essential oil silica nanoparticles at different magnifications are shown in FIG. 3. From FIG. 3, it can be seen that the peony bark essential oil silica nanoparticles have a spherical shape, a particle size of 1 μm, relatively uniform particle distribution, and a tendency for aggregation among particles. In FIG. 3, (a) represents a magnification of 4520 times, and (b) represents a magnification of 15000 times.

Experiment 2: Infrared Spectrum Analysis

Figure 4:
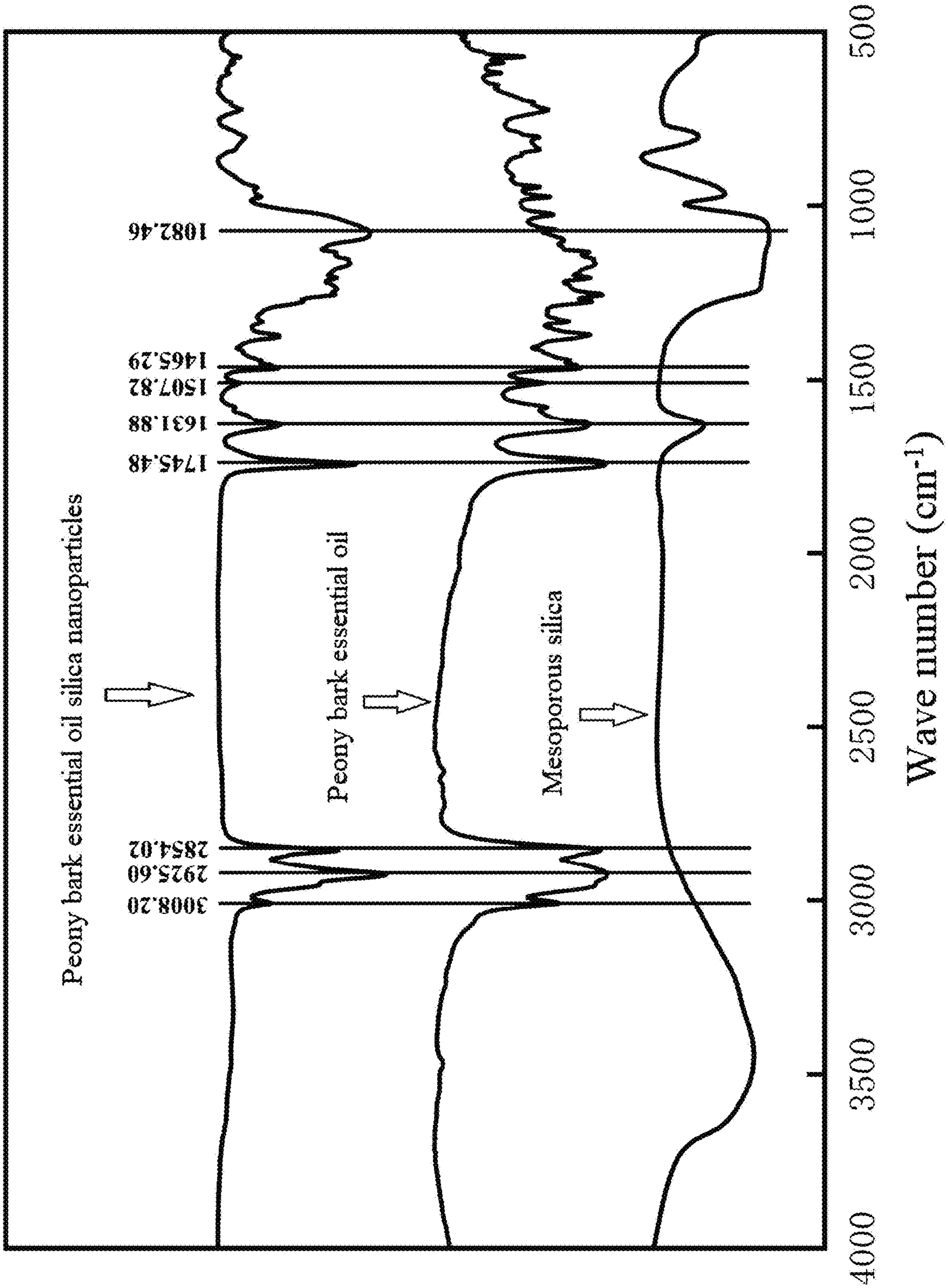
FIG. 4 shows comparative spectra of peony bark essential oil, mesoporous silica, and peony bark essential oil silica nanoparticles.

A competitive experiment of the peony bark essential oil, the mesoporous silica, and the peony bark essential oil silica nanoparticles:

Comparative spectra of the peony bark essential oil, the mesoporous silica, and the peony bark essential oil silica nanoparticles prepared in Example 1 were obtained by detecting the peony bark essential oil, the mesoporous silica, and the peony bark essential oil silica nanoparticles using an infrared spectrometer FTIR. The comparative spectra of the peony bark essential oil, the mesoporous silica, and the peony bark essential oil silica nanoparticles are shown in FIG. 4. Existed and newly formed functional groups and chemical bond structures of the peony bark essential oil silica nanoparticles were observed, and interaction and bonding between the peony bark essential oil and the mesoporous silica were analyzed. Whether a Fourier transform infrared spectrum analysis curve of the peony bark essential oil silica nanoparticles was consistent with a standard spectrum of the mesoporous silica was compared. Characteristic absorption peaks were used for performing qualitative analysis of functional groups, and characteristic peak intensities were used for performing quantitative analysis.

By comparing the spectra of the peony bark essential oil and the peony bark essential oil silica nanoparticles in FIG. 4, it can be seen that the common absorption peak, i.e., the absorption peak at 3008.20 $cm^{-1}$, is attributed to a phenolic hydroxyl group, and peaks at 1507.82 $cm^{-1}$ and 1465.29 $cm^{-1}$ indicate the existence of a benzene ring. These functional groups and chemical bonds may correspond to chemical structures of main ingredients in the peony bark essential oil, and prove that the peony bark essential oil has been successfully adsorbed in the mesoporous silica. In addition, the peony bark essential oil silica nanoparticles exhibit a spectrum similar to the mesoporous silica, and have a similar strong absorption band at 1082.46 $cm^{-1}$, which is unique to asymmetric tensile vibration of a silicon oxygen bond, proving that the peony bark essential oil is only physically adsorbed and original chemical bonds of the nanomaterials remain unchanged.

Experiment 3: BET Specific Surface Area Analysis

Figure 5:
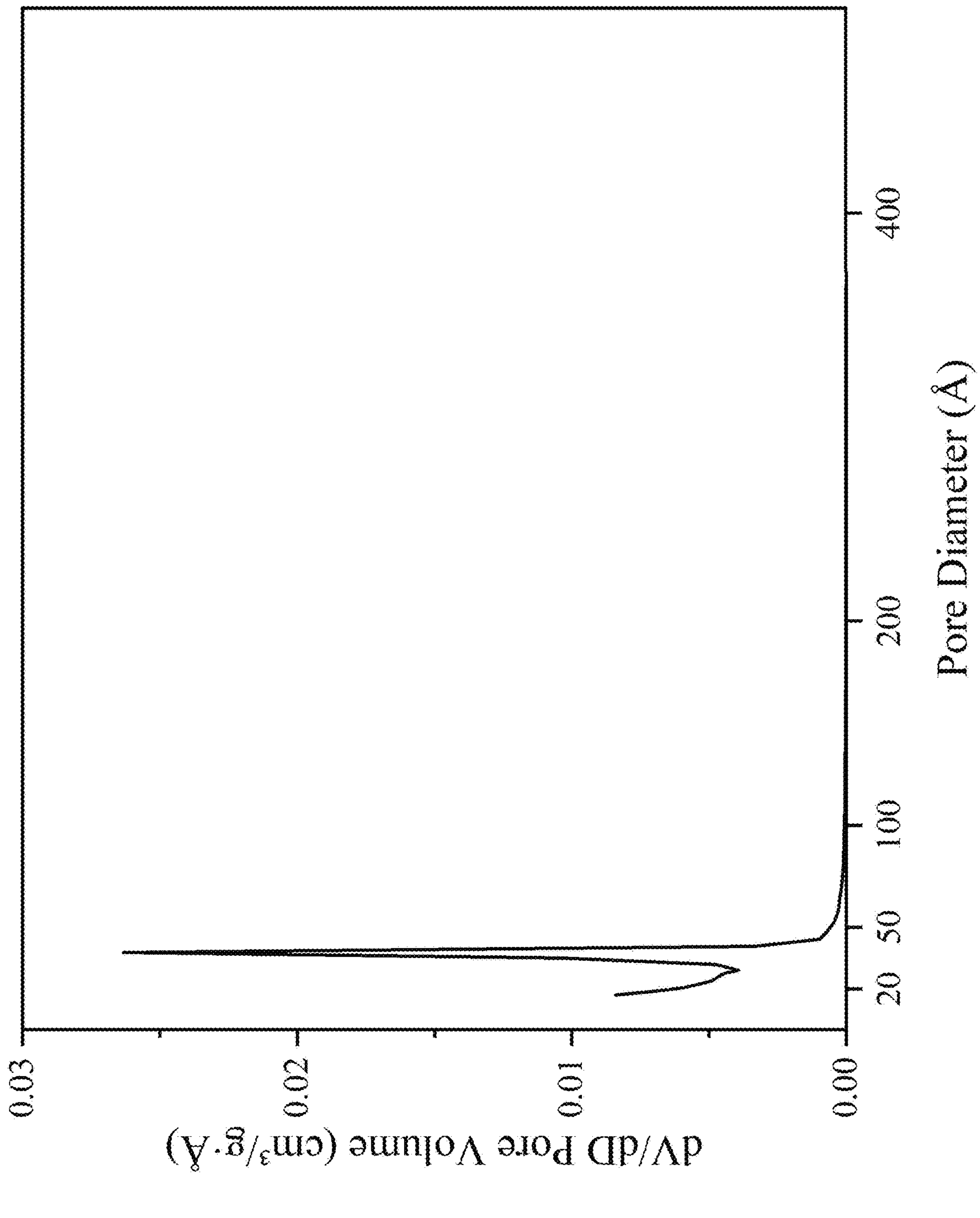
FIG. 5 shows diameter and volume curves of peony bark essential oil silica nanoparticles.
Figure 6:
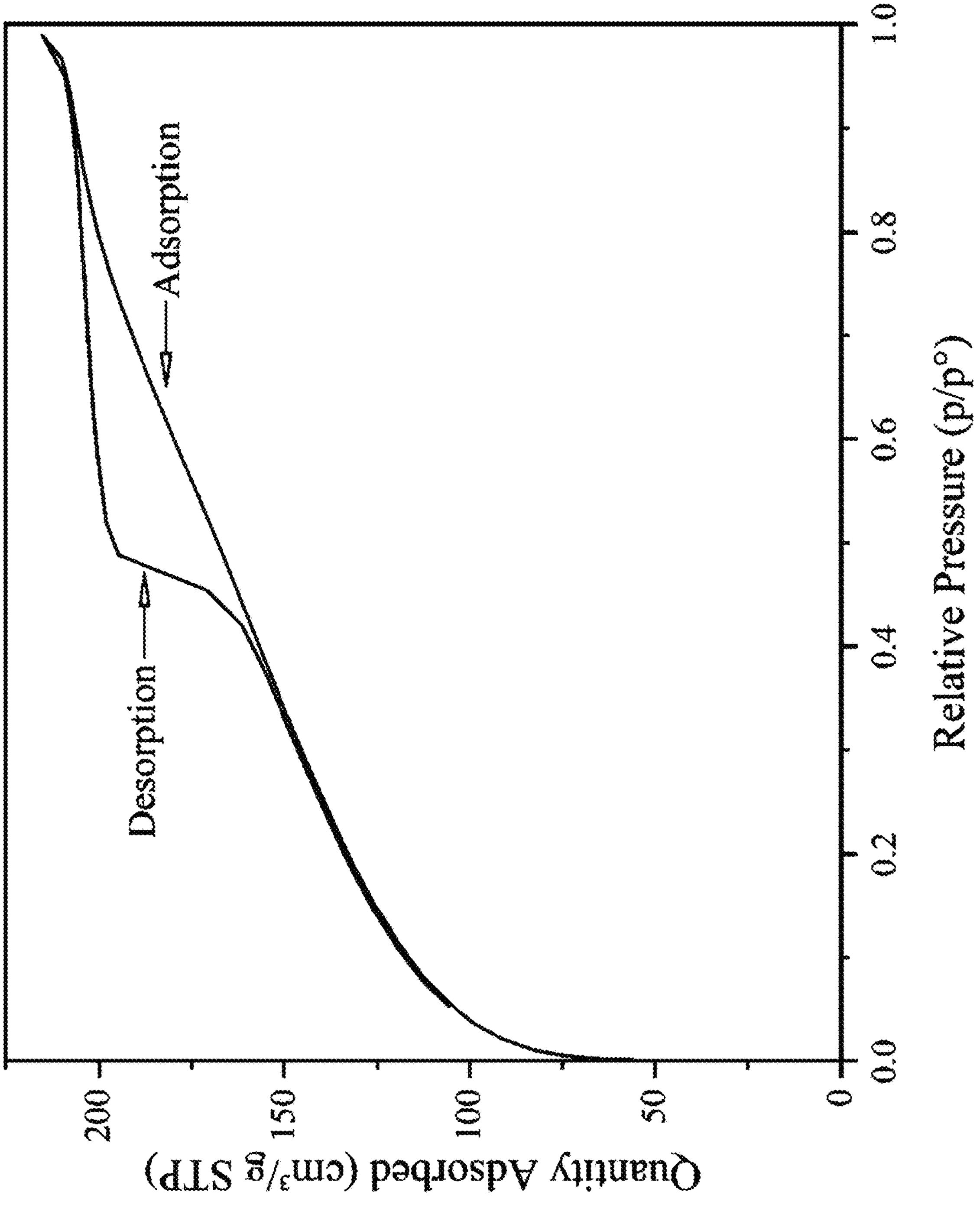
FIG. 6 shows adsorption and desorption curves of peony bark essential oil silica nanoparticles.

The specific surface area and average pore size of the peony bark essential oil silica nanoparticles and the mesoporous silica were measured using a specific surface area and pore size analyzer, and adsorption and desorption curves were obtained, as shown in FIG. 5 and FIG. 6. A diameter and volume curve of the peony bark essential oil silica nanoparticles is shown in FIG. 5, and an adsorption and desorption curve of the peony bark essential oil silica nanoparticles is shown in FIG. 6. Whether the essential oil is loaded may be analyzed by the specific surface areas and average pore sizes of the peony bark essential oil silica nanoparticles and the mesoporous silica. Types of the adsorption and desorption curves may indicate the way the material adsorbs the essential oil, and whether the material is a mesoporous material.

From the peak in FIG. 5, the average pore size of the peony bark essential oil silica nanoparticles is 3.2346 nm (32.346 Å). From the adsorption and desorption curve of the peony bark essential oil silica nanoparticles in FIG. 6, it can be seen that the isotherm of the mesoporous silica is of type IV (a). This type of curve demonstrates that the nanomaterial exhibits hysteresis during desorption, and is a characteristic isotherm of mesoporous materials. The shape of pores in the nanomaterial may be inferred from the type of a hysteresis loop appearing in the IV type isotherm. From the figure, it can be seen that the hysteresis loop type is $H_2$ type, inferring that the pore is a wide mouth and large cavity flask shaped pore. This type of hysteresis loop is commonly found in mesoporous silica materials, and proves the property of the nanomaterial. The aforementioned curve type was classified and proposed by the International Union of Pure and Applied Chemistry (IUPAC) in 2015.

Experiment 4: Thermogravimetric Analysis

Figure 7:
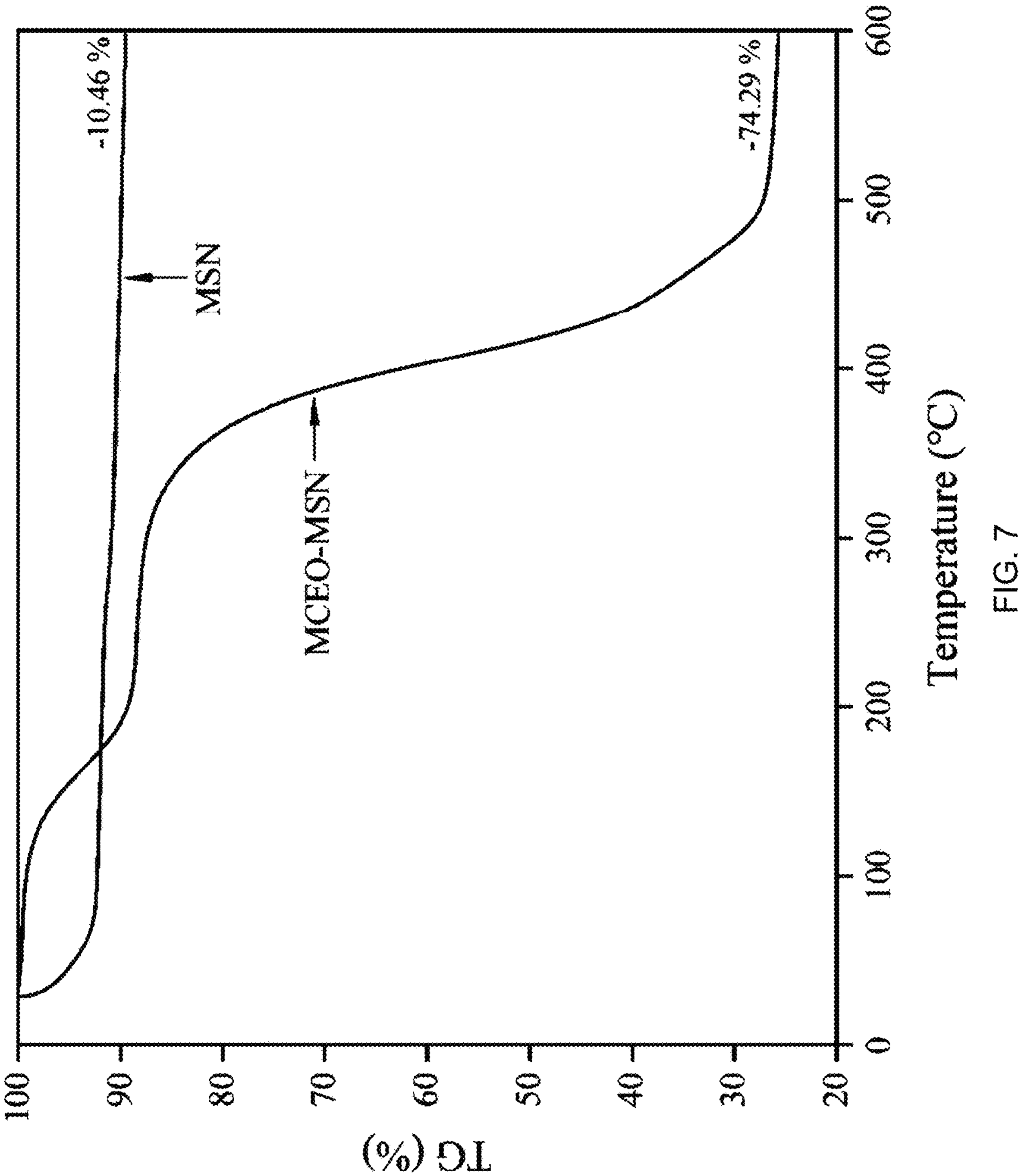
FIG. 7 shows a thermogravimetric analysis curve.

Encapsulation efficiency of high-temperature calcined and encapsulated peony bark essential oil silica nanoparticles was measured: the peony bark essential oil and the peony bark essential oil silica nanoparticles were evaporated at 300-500 °C, and the evaporation amount was the encapsulation amount of the peony bark essential oil silica nanoparticles. A thermogravimetric analysis curve is shown in FIG. 7. From FIG. 7, it can be seen that as the temperature increased, the mass of the peony bark essential oil silica nanoparticles and the peony bark essential oil gradually decreased. From the figure, the thermogravimetric analysis curve of the peony bark essential oil only slightly decreases at about 100 °C, inferring that the mass loss was caused by water evaporation. At 100-600 °C, the mass of the peony bark essential oil almost did not change, proving the thermal stability of the peony bark essential oil silica nanoparticles from another perspective. The mass curve of the peony bark essential oil silica nanoparticles shows a phased decrease at 100 °C and 300-500 °C, and the mass loss at 100 °C was caused by water evaporation. A main ingredient of the peony bark essential oil is paeonol, and the paeonol has a boiling point of 301.9 °C. The boiling points of other ingredients are mostly in a range of 300-500 °C, and the mass loss within this temperature range was mainly caused by evaporation of the essential oil.

Tests for detecting an anti-mite effect of the peony bark essential oil silica nanoparticles:

Experiment 5: Contact Killing Experiment

The contact mortality rate of dermatophagoides farinae adults was measured using the peony bark essential oil and the peony bark essential oil silica nanoparticles of different concentrations. A piece of filter paper (60×60 mm) was stuck onto the inner bottom of a weighing bottle (60×30 mm), and then the filter paper was evenly wetted with solutions of different concentrations. The weighing bottle was dried in a fume hood for 3 min, and then 30 dermatophagoides farinae were placed on the filter paper. The weighing bottle was placed in a dark environment of 25±1 °C and 75±5% relative humidity. After placement for 12, 24, and 48 h, the mortality rate of the dermatophagoides farinae was observed under a stereomicroscope. If the body and appendages of a mite do not respond to acupuncture, the mite is considered dead. An equal amount of acetone, mesoporous silica, and Tween80 were used as blank controls for the experiment. Results are shown in Table 1 and FIG. 8.

TABLE 1

Contact killing effect of the peony bark essential oil and the peony bark essential oil silica nanoparticles on the dermatophagoides farinae

| Treatment | | Time | Lethal concentration (95% CL*) $LC_{10}$ | $LC_{50}$ | $LC_{90}$ | $x^2$ (df = 13) |
|---|---|---|---|---|---|---|
| Contact activity (mg/cm$^2$) | Peony bark essential oil | 12 h | 0.123 (0.096-0.147) | 0.366 (0.323-0.421) | 1.092 (0.865-1.513) | 32.379 |
| | | 24 h | 0.089 (0.064-0.112) | 0.294 (0.251-0.350) | 0.972 (0.733-1.473) | 48.715 |
| | | 48 h | 0.079 (0.070-0.088) | 0.223 (0.209-0.239) | 0.628 (0.560-0.718) | 12.571 |
| | Peony bark essential oil silica nano particles | 12 h | 0.094 (0.074-0.112) | 0.381 (0.337-0.439) | 1.556 (1.199-2.202) | 20.706 |
| | | 24 h | 0.043 (0.030-0.056) | 0.194 (0.166-0.228) | 0.878 (0.659-1.310) | 35.421 |
| | | 48 h | 0.041 (0.029-0.052) | 0.141 (0.121-0.164) | 0.491 (0.388-0.679) | 41.714 |

Figure 8:
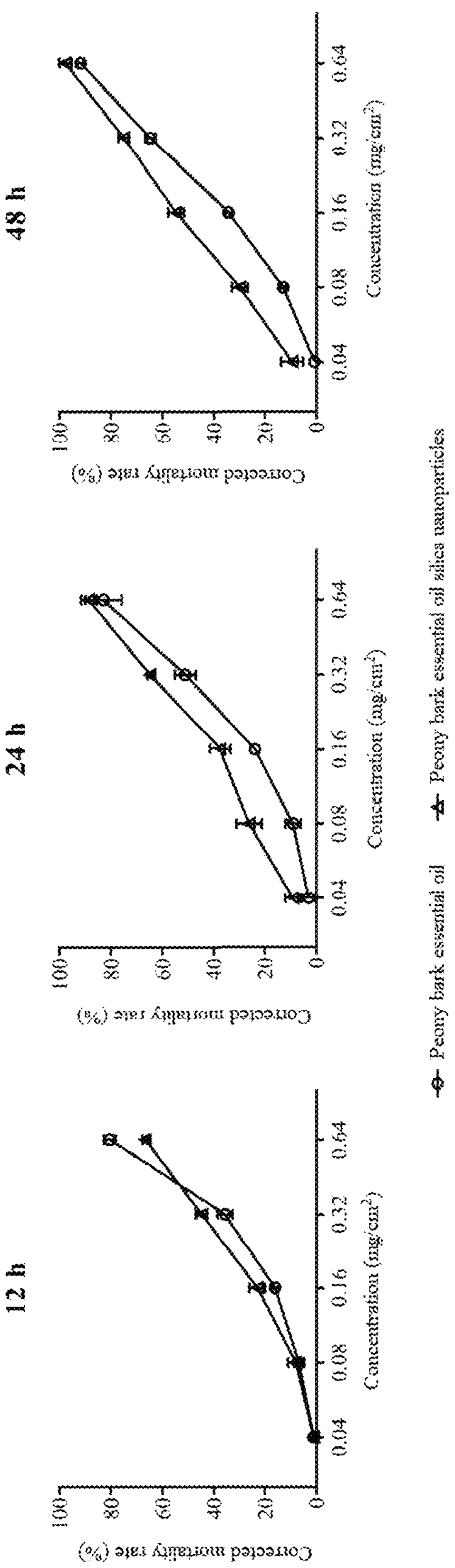
FIG. 8 shows results of a contact killing experiment on peony bark essential oil and peony bark essential oil silica nanoparticles against mites.

As shown in FIG. 8, the mortality rate of mites in both the peony bark essential oil group and the peony bark essential oil silica nanoparticle group shows a dose-dependent and time-dependent uptrend. At the concentration of 0.64 mg/cm$^2$, almost all mites were killed by the peony bark essential oil silica nanoparticles after treatment for 48 h. In addition, the mortality rate of mites treated with the peony bark essential oil silica nanoparticles at the concentration of 0.16 mg/cm$^2$ for 48 h was 54.76±3.15%, which was higher than that treated by the peony bark essential oil ($P<0.05$).

Experiment 6: Fumigation Experiment

Figure 9:
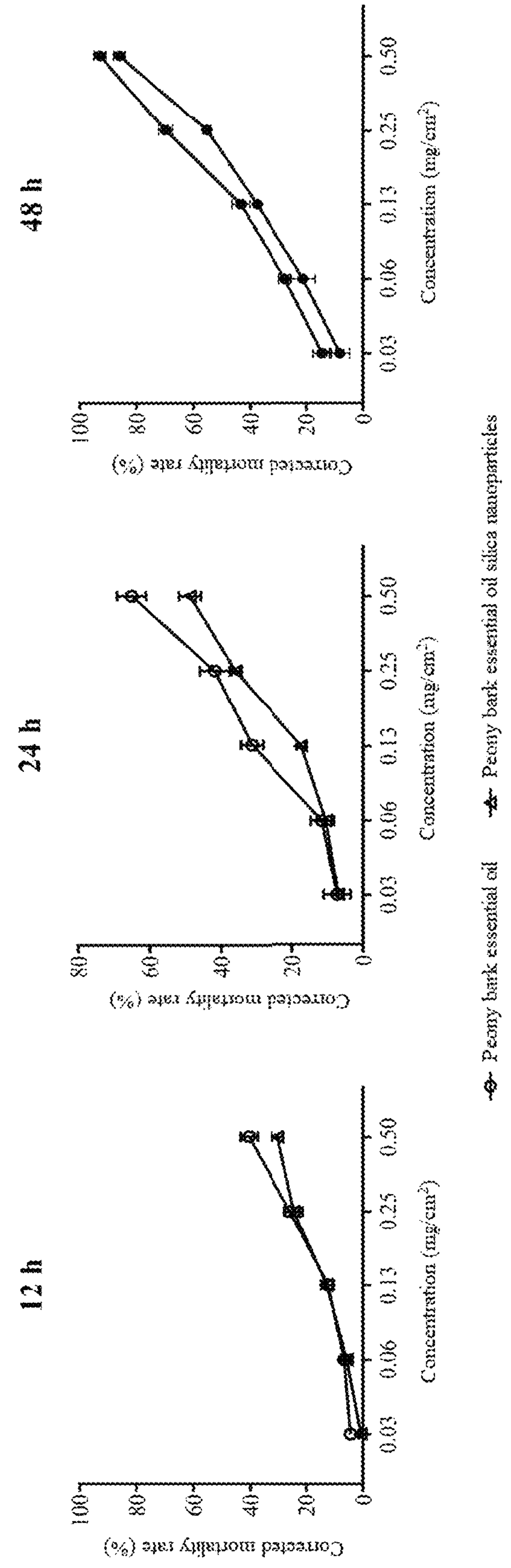
FIG. 9 shows results of a fumigation experiment on peony bark essential oil and peony bark essential oil silica nanoparticles against mites.

The fumigation mortality rate of dermatophagoides farinae adults was measured using the peony bark essential oil and the peony bark essential oil silica nanoparticles of different concentrations. 30 dermatophagoides farinae were placed in a weighing bottle (60×30 mm). Another piece of filter paper (30×30 mm) was treated with the peony bark essential oil and the peony bark essential oil silica nanoparticles of different concentrations, and stuck onto the cap of the weighing bottle to prevent the mites from directly contacting the solution. The weighing bottle was placed in a dark environment of 25±1 °C and 75±5% relative humidity. After placement for 12, 24, and 48 h, the mites were observed, and the death count was counted under a vertical microscope. An equal amount of acetone, mesoporous silica, and Tween80 were used as blank controls for the experiment. Results are shown in Table 2 and FIG. 9.

TABLE 2

Fumigation effect of the peony bark essential oil and the peony bark essential oil silica nanoparticles on the dermatophagoides farinae

| Treatment | | Time | Lethal concentration (95% CL*) LC$_{10}$ | LC$_{50}$ | LC$_{90}$ | $x^2$ (df = 13) |
|---|---|---|---|---|---|---|
| Fumigation activity (mg/cm$^3$) | Peony bark essential oil | 12 h | 0.087 (0.069-0.105) | 0.737 (0.596-0.975) | 6.232 (3.823-12.236) | 10.542 |
| | | 24 h | 0.044 (0.027-0.060) | 0.300 (0.245-0.387) | 2.054 (1.276-4.269) | 34.441 |
| | | 48 h | 0.036 (0.025-0.047) | 0.177 (0.152-0.208) | 0.867 (0.641-1.322) | 32.145 |
| | Peony bark essential oil silica nanoparticles | 12 h | 0.113 (0.079-0.145) | 0.940 (0.662-1.645) | 7.835 (3.665-28.420) | 23.428 |
| | | 24 h | 0.054 (0.042-0.067) | 0.514 (0.431-0.641) | 4.866 (3.142-8.747) | 11.841 |
| | | 48 h | 0.027 (0.018-0.035) | 0.127 (0.109-0.147) | 0.600 (0.457-0.872) | 32.395 |

In the fumigation experiment, the peony bark essential oil and the peony bark essential oil silica nanoparticles both had a certain inhibitory and killing effect on the dermatophagoides farinae at 12-48 h, and the mortality rate increased with the increase of concentration. At the low concentration (0.03 mg/cm$^3$), the mortality rate caused by the peony bark essential oil did not increase significantly over time. The LC$_{50}$ values of the peony bark essential oil and the peony bark essential oil silica nanoparticles at 24 h were 0.300 and 0.514 mg/cm$^3$ respectively.

Experiment 7: Repellence Experiment

A piece of filter paper was equally divided into two semicircles, one semicircle was treated with 50 μg of the peony bark essential oil and the peony bark essential oil silica nanoparticles with the concentration of LC$_{50}$ respectively, and the other semicircle was treated with 50 μg of acetone, Tween 80 and unencapsulated mesoporous silica respectively as blank controls. The two semicircles were dried in a fume hood for 3 min, and then pasted back together and stuck onto a culture dish (85 mm in diameter). 30 adult dermatophagoides farinae were placed at the midline of the two semicircles, and the circular filter paper was surrounded by Vaseline to prevent the mites from escaping. The culture dish was placed in a dark environment of 25±1 °C and 75±5% relative humidity. After exposure for 3, 6, 12, and 24 h, the number of the dermatophagoides farinae on each semicircle was counted under a stereomicroscope. Results are shown in FIG. 10.

Figure 10:
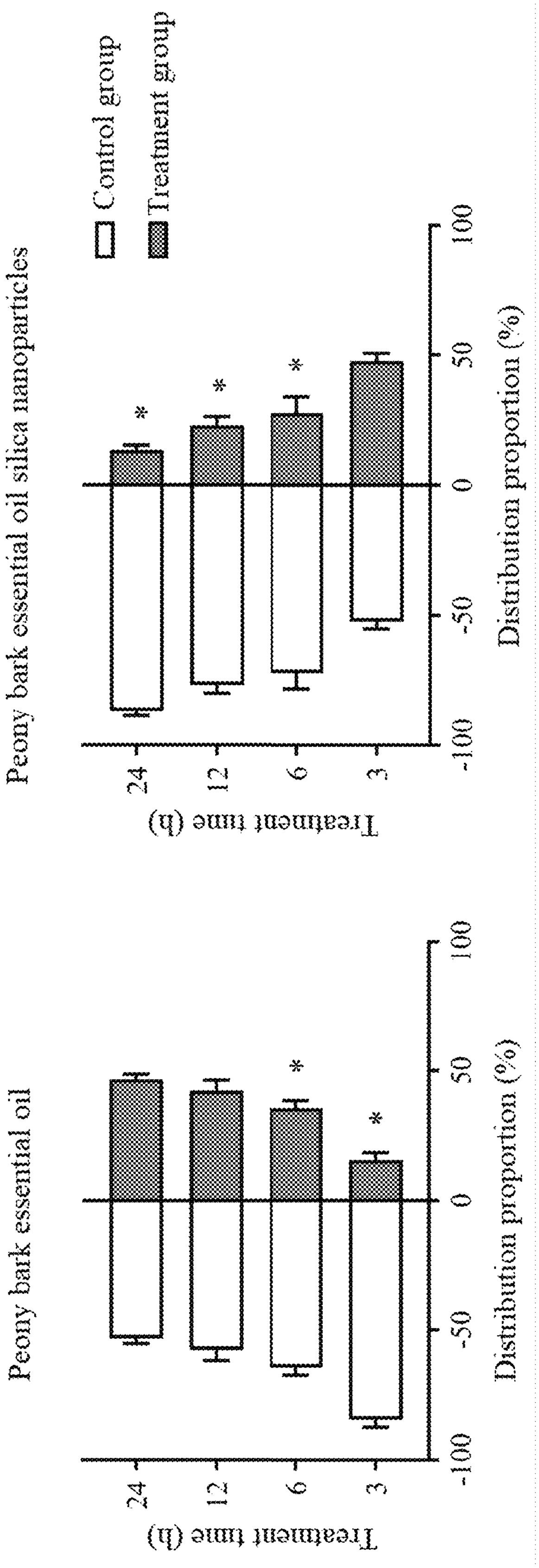
FIG. 10 shows results of a repellence experiment on peony bark essential oil and peony bark essential oil silica nanoparticles against mites.

As shown in FIG. 10, the repellent effects of the peony bark essential oil group and the peony bark essential oil silica nanoparticle group are significantly different within 24 h. The peony bark essential oil had a better repellent effect at 3 h ($P<0.05$), while the peony bark essential oil silica nanoparticles had almost no repellent effect at the first 3 h ($P>0.05$) but an increasing repellent effect thereafter. The peony bark essential oil silica nanoparticles had the largest difference in the repellent effect at 24 h ($P<0.05$), and the effect showed a continuous increasing trend over time.

Experiment 8: Toxicity Experiment

Figure 11:
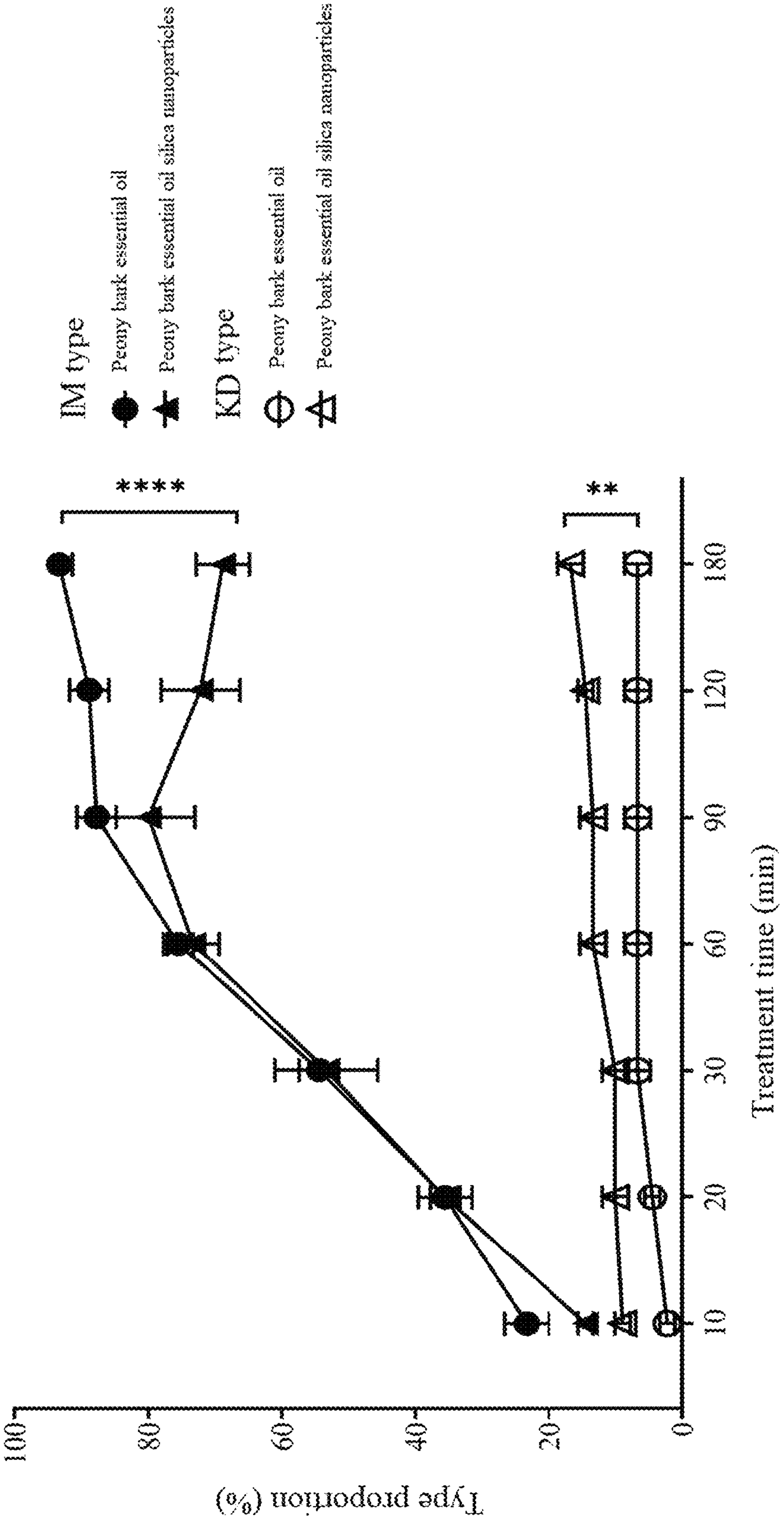
FIG. 11 shows results of a toxicity experiment on peony bark essential oil and the peony bark essential oil silica nanoparticles.

A piece of filter paper (60×60 mm) was stuck onto the inner bottom of a culture dish (85 mm in diameter), and then treated with the peony bark essential oil and the peony bark essential oil silica nanoparticles with the concentration of LC$_{50}$ respectively. The culture dish was dried in a fume hood for 3 min, and 30 adult dermatophagoides farinae were placed on the filter paper with the back up. The culture dish was placed in a dark environment of 25±1 °C and 75±5% relative humidity. Toxicity symptoms of the dermatophagoides farinae were evaluated under a stereomicroscope. If the body and appendages of a mite do not respond to acupuncture, the mite is considered dead. As shown in FIG. 11, there are two types of toxicity symptoms: KD and IM. The KD type represents paralysis and convulsions caused by damage to the nervous system of mites, while the IM type represents quiet death of mites caused by damage to the respiratory system. The peony bark essential oil group has an increased proportion of the IM type over time, reaching the maximum at 180 min, while a relatively small proportion of the KD type. The incidence of the IM type symptoms in the peony bark essential oil silica nanoparticle group gradually increased over time, but overall was slightly lower than that in the peony bark essential oil group; while the incidence of the KD type symptoms in the peony bark essential oil silica nanoparticle group was higher than that in the peony bark essential oil group. Results of the toxicity symptom experiment showed that the incidence of the IM type was significantly higher than that of the KD type in both treatment groups, indicating that both the peony bark essential oil and the peony bark essential oil silica nanoparticles mainly act on the respiratory system of the dermatophagoides farinae, and the mechanism of action of the essential oil on mites remains unchanged after encapsulation.

Example 2: Same as Example 1, Except That

In step 2.1, the hexadecyl trimethyl ammonium bromide aqueous solution was prepared by mixing hexadecyl trimethyl ammonium bromide with water in a mass volume ratio of 2 g:60 mL.

In step 2.2, the volume ratio of the ethanol to the ammonium hydroxide to the hexadecyl trimethyl ammonium bromide aqueous solution was 40:15:60; the mass volume ratio of the tetraethyl orthosilicate to the hexadecyl trimethyl ammonium bromide aqueous solution was 3 g:60 mL; and the ethanol was an ethanol aqueous solution with a concentration of 60 vt %.

In step 2.3, the centrifugal speed was 12000 rpm and the centrifugal time was 15 min.

In step 2.4, the calcination temperature was 500 °C and the calcination time was 7 h.

In step 3.1, the solid-liquid ratio of the mesoporous silica to the peony bark essential oil to the chloroform was 90 mg:50 μL:0.5 mL.

In step 3.2, the standing temperature was 22.5 °C. In step 3.3, the number of repetitions was 2.

The peony bark essential oil silica nanoparticles prepared in this example have the encapsulation performance and anti-mite effect similar to those of Example 1.

Example 3: Same as Example 1, Except That

In step 2.1, the hexadecyl trimethyl ammonium bromide aqueous solution was prepared by mixing hexadecyl trimethyl ammonium bromide with water in a mass volume ratio of 3 g:40 mL.

In step 2.2, the volume ratio of the ethanol to the ammonium hydroxide to the hexadecyl trimethyl ammonium bromide aqueous solution was 60:10:40; the mass volume ratio of the tetraethyl orthosilicate to the hexadecyl trimethyl ammonium bromide aqueous solution was 4 g:40 ml; and the ethanol was an ethanol aqueous solution with a concentration of 80 vt %.

In step 2.3, the centrifugal speed was 18000 rpm and the centrifugal time was 25 min.

In step 2.4, the calcination temperature was 600 °C and the calcination time was 5 h.

In step 3.1, the solid-liquid ratio of the mesoporous silica to the peony bark essential oil to the chloroform was 110 mg:150 μL:2 mL.

In step 3.2, the standing temperature was 20 °C. In step 3.3, the number of repetitions was 4.

The peony bark essential oil silica nanoparticles prepared in this example have the encapsulation performance and anti-mite effect similar to those of Example 1.

Example 4: A Preparation Method of an Anti-Mite Laundry Detergent

Step 1:8 g of sodium ethoxylated alkyl sulfate, 2 g of sodium lauroyl sarcosinate, 12 g of coconut diethanolamide, 4 g of cocoamidopropyl betaine, 8 g of alkyl glycoside, and 50 g of water were mixed at 45 °C to obtain a mixture A after cooling to 15 °C.

Step 2: the mixture A, 8 g of the peony bark essential oil mesoporous silica nanoparticles prepared in Example 1, 3 g of propylene glycol, 2 g of guar gum, 0.2 g of sodium polyacrylate, 1 g of tetrasodium glutamate diacetate, 0.2 g of Casson DL606, and 16 g of water were mixed to obtain a mixture B.

Step 3: pH of the mixture B was regulated to 7 with 2.5 g of sodium citrate to obtain the anti-mite laundry detergent.

Example 5: A Preparation Method of an Anti-Mite Laundry Detergent

Step 1: 7 g of sodium alcohol ether sulphate, 3 g of sodium lauroyl glycinate, 12 g of coconut diethanolamide, 5 g of cocoamidopropyl betaine, 3 g of sodium polyacrylate, and 20 g of water were mixed at 45 °C to obtain a mixture A after cooling to 15 °C.

Step 2: the mixture A, 5 g of the peony bark essential oil mesoporous silica nanoparticles prepared in Example 2, 4 g of propylene glycol, 0.1 g of guar gum, 0.2 g of sodium polyacrylate, 0.2 g of tetrasodium glutamate diacetate, 0.1 g of Casson DL501, and 16 g of water were mixed to obtain a mixture B.

Step 3: pH of the mixture B was regulated to 6 with 2 g of sodium citrate to obtain the anti-mite laundry detergent.

Example 6: A Preparation Method of an Anti-Mite Laundry Detergent

Step 1:10 g of lauryl sulfate, 1 g of sodium lauroyl sarcosine, 20 g of alkyl glycoside, 3 g of cocoamidopropyl betaine, 2 g of sodium polyacrylate, and 45 g of water were mixed at 45 °C to obtain a mixture A after cooling to 15 °C.

Step 2: the mixture A, 15 g of the peony bark essential oil mesoporous silica nanoparticles prepared in Example 3, 0.5 g of propylene glycol, 4 g of guar gum, 2 g of sodium polyacrylate, 2.4 g of tetrasodium glutamate diacetate, 0.5 g of Casson DL605, and 20 g of water were mixed to obtain a mixture B.

Step 3: pH of the mixture B was regulated to 8 with 3 g of sodium citrate to obtain the anti-mite laundry detergent.

Comparative example 1: Same as Example 1, except that: the mesoporous silica prepared in step (2) was replaced with hollow silica nanotubes, and the hollow silica nanotubes were prepared by the following method:

0.1 g of tartaric acid was dissolved in 25 ml of ethanol. 10 ml of ammonia water was added after complete dissolution of the tartaric acid to form an ammonium tartrate template, and the solution was allowed to stand for 2 h. 5.0 ml of ethyl orthosilicate was slowly dropwise added to the above solution and stirred evenly for 1 h, and the solution was allowed to stand for 12 h. Finally, the solution was rinsed three times with distilled water to remove the ammonium tartrate template. Suction filtration was performed to obtain white powder, i.e., the hollow silica nanotubes.

Comparative example 2: Same as Example 1, except that: the mesoporous silica prepared in step (2) was replaced with mesoporous carbon with a pore size of 10-30 nm.

Comparative example 3: Same as Example 1, except that: the mesoporous silica prepared in step (2) was replaced with mesoporous titanium dioxide with a pore size of 10-30 nm.

Comparative example 4: Same as Example 1, except that: the peony bark essential oil was replaced with lemongrass essential oil. The lemongrass essential oil was obtained by performing steam distillation extraction on lemongrass, and main ingredients were 18 wt % of limonene and 39 wt % of citral.

Comparative example 5: Same as Example 1, except that: the peony bark essential oil was replaced with patchouli essential oil. The patchouli essential oil was prepared by the following method:

An entrainer that accounts for 0.8% of the weight of patchouli leaves was sprayed into the patchouli leaves, and then the patchouli leaves were added to an extraction kettle. Continuous circulating extraction was performed using a supercritical carbon dioxide fluid, the temperature of the extraction kettle was controlled to 40 °C, the extraction pressure was 20 MPa, the flow rate was 17 kg/h, and the extraction time was 3 h. The entrainer included the following components in parts by weight: 60 parts of ethanol, 5 parts of petroleum ether, and 0.3 part of methylaniline. The carbon dioxide fluid entered a separator for separation after extraction. The flow rate of the carbon dioxide fluid was 12 kg/h, the separator pressure was 7 MPa, the separator temperature was 40 °C, and the extraction time was 2 h. The extract was discharged from the bottom of the separator and allowed to stand, and the patchouli essential oil was obtained through oil-water separation.

Comparative example 6: Same as Example 1, except that: the peony bark essential oil was replaced with citronella essential oil. The citronella essential oil was prepared by the following method:

Freeze-dried citronella powder and ethanol were mixed evenly in a weight ratio of 1:5 and placed in an extraction kettle. Supercritical $CO_2$ was introduced into the extraction kettle, the temperature of the extraction kettle was controlled to 45 °C, and the extraction pressure was set to 30 Mpa. $CO_2$ containing the extract flowed out of the extraction kettle, entered a separation kettle and was separated under reduced pressure for 2 h at a pressure of 8 Mpa and a temperature of 28 °C in the separation kettle to obtain the citronella essential oil.

According to the mite contact killing test method mentioned above, a mite killing test was performed on the materials prepared in Examples 1-3 and Comparative examples 1-6. The test concentration of each group of materials was 0.64 mg/cm$^2$, and the test time was 48 h. The mite killing test results were obtained and statistically analyzed as follows:

TABLE 3

Effects of composite materials with different types of mesoporous carriers and essential oils on acaricidal performance

| Group | Mortality rate of mites (%) |
|---|---|
| Example 1 | 99.8 |
| Example 2 | 98.7 |
| Example 3 | 98.5 |
| Comparative example 1 | 46.7 |
| Comparative example 2 | 48.3 |
| Comparative example 3 | 39.4 |
| Comparative example 4 | 51.1 |
| Comparative example 5 | 44.3 |
| Comparative example 6 | 55.8 |
| Lemongrass essential oil in Comparative example 4 | 76.9 |
| Patchouli essential oil in Comparative example 5 | 81.2 |
| Citronella essential oil in Comparative example 6 | 79.3 |
| Peony bark essential oil in Comparative example 1 | 85.9 |

From the results in Table 3, it can be seen that the mite-killing rates of Comparative examples 1-3 were significantly lower than that of Example 1, indicating that loading the peony bark essential oil by the hollow silica nanotubes, the mesoporous carbon, the mesoporous titanium dioxide and other carriers may significantly reduce the mite-killing rates of the composite materials. The different slow-release effects of the carriers may reduce the working concentration of the peony bark essential oil, resulting in a decrease in the overall acaricidal performance of the composite materials, and inhibiting the original acaricidal effect of the peony bark essential oil. Therefore, it is crucial to choose a mesoporous carrier that is compatible with the peony bark essential oil.

The mite-killing rates of Comparative examples 4-6 were significantly lower than that of the respective pure essential oil, which might be due to the fact that the mesoporous silica nanoparticles continuously released the essential oil at a low concentration, and the essential oil could hardly reach an effective acaricidal concentration. Therefore, the mesoporous silica nanoparticles reduced the acaricidal efficacy of the lemongrass essential oil, the patchouli essential oil, and the citronella essential oil. However, the slow-release effect of the mesoporous silica nanoparticles did not affect the acaricidal efficacy of the peony bark essential oil, which might be related to the types of volatile substances in the peony bark essential oil. The volatilization rate of these substances was not continuously and significantly reduced by the mesoporous silica nanoparticles. In addition, the acaricidal efficacy of the peony bark essential oil being unaffected might also be related to a lower mite-killing working concentration of the peony bark essential oil, and even if the peony bark essential oil was continuously released at a lower concentration, the acaricidal efficacy was not affected.

Experiment 9: Skin Irritation Experiment on Rabbits by Multiple Dosing

Figure 12:
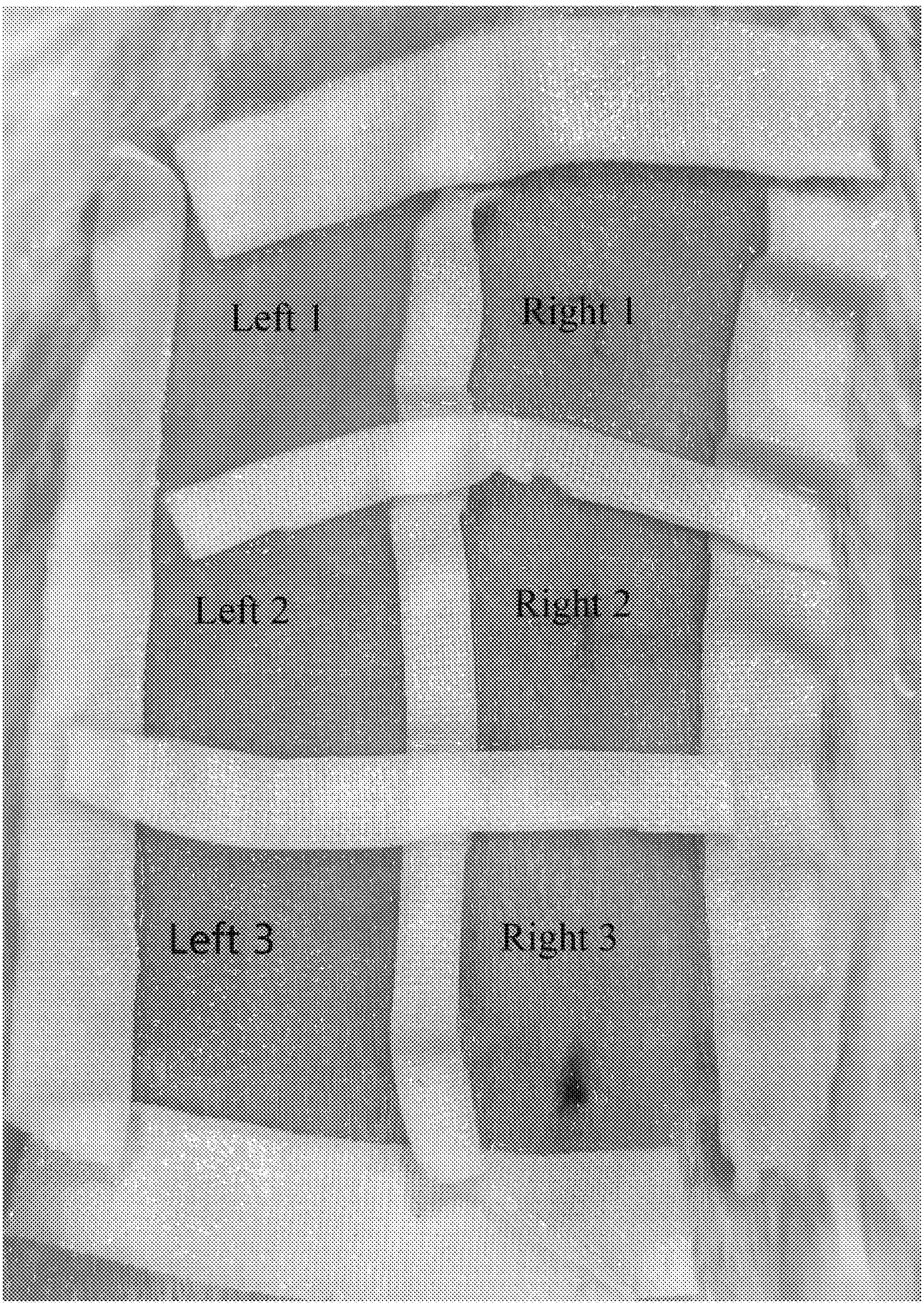
FIG. 12 shows a schematic diagram of separated skin areas on the back of a rabbit.

As shown in FIG. 12, skins of four rabbits were prepared, and after 24 h, a site for skin preparation of each rabbit was separated into six identical experimental areas. For each rabbit, 0.2 mL of a daily chemical solution containing the peony bark essential oil silica nanoparticles (containing 0.13 mL of the peony bark essential oil after conversion) was applied to left areas 1 and 2, 0.2 mL of a daily chemical solution mixed with the composite material prepared in Comparative example 2 (containing 0.12 mL of the peony bark essential oil after conversion) was applied to right areas 1 and 2, 0.12 mL of the peony bark essential oil was applied to a left area 3, and an equal amount of blank daily chemical solution was applied to a right area 3 as a control. Each area was covered with two layers of gauze and one layer of cellophane, and then secured with nonirritating tape and bandage.

Skin irritation experiment by multiple dosing: test samples were applied to experimental animals continuously for 7 days, once a day at the same time point, and at the same sites. The presence of erythema and edema at the application sites was observed and recorded 1 h after the chemicals were cleaned every day, and the presence of erythema and edema at the application sites was observed and recorded 1, 24, 48, and 72 h respectively after the chemicals were cleaned on the 7th day.

The skin irritation response was scored and the irritation intensities were evaluated according to Table 4 for the skin toxicity test by multiple dosing. The application sites were visually observed 1 h after the chemicals were removed every time for the presence of erythema, edema, pigmentation, bleeding points and the like, and the occurrence time and extinction time thereof, and the erythema and edema were scored. An average irritation score was calculated for each experimental area of each rabbit during the observation period based on the scoring results. The score of skin irritation intensity=(total score of erythema+total score of edema)/total number of experimental areas. A score of 0-0.49 is rated as nonirritating, a score of 0.5-2.99 is rated as mild irritating, a score of 3.0-5.99 is rated as moderate irritating, and a score of 6.0-8.0 is rated as strong irritating.

TABLE 4

Scoring criteria for skin irritation response

| | Score |
|---|---|
| Erythema symptom | |
| No erythema | 0 |
| Mild erythema (barely visible) | 1 |
| Moderate erythema (clearly visible) | 2 |
| Severe erythema | 3 |
| Purple red erythema to mild eschar formation | 4 |
| Edema symptom | |
| No edema | 0 |
| Mild edema (barely visible) | 1 |
| Moderate edema (obvious bulging) | 2 |
| Severe edema (skin bulging of 1 mm, with a clear contour) | 3 |
| Severe edema (skin bulging of more than 1 mm with enlargement) | 4 |
| Maximum total score | 8 |

Results are as follows:

TABLE 5

Scores (in points) of skin irritation response to multiple dosing of the peony bark essential oil daily chemical solution

| Group | Experimental area (block) | Average response value 1 d | 2 d | 3 d | 4 d | 5 d | 6 d | After dosing 1 h | 24 h | 48 h | 72 h | Average daily score per area |
|---|---|---|---|---|---|---|---|---|---|---|---|---|
| Daily chemical solution mixed with the peony bark essential oil silica nanoparticles | 8 | 0 | 0 | 0 | 0 | 0 | 0 | 0 | 0 | 0 | 0 | 0 |
| Blank control | 4 | 0 | 0 | 0 | 0 | 0 | 0 | 0 | 0 | 0 | 0 | 0 |
| Peony bark essential oil | 4 | 2.0 | 2.5 | 3.5 | 3.75 | 4.25 | 3.5 | 2.0 | 0.25 | 0 | 0 | 3.25 |
| Daily chemical solution mixed with the composite material prepared in Comparative example 2 | 8 | 1.5 | 2.0 | 3.0 | 3.5 | 3.75 | 2.75 | 1.5 | 0 | 0 | 0 | 2.75 |

Results in Table 5 indicate that using the mesoporous silica particles as a carrier may completely eliminate skin irritation of the peony bark essential oil, and is more suitable and safer for application in daily chemical products, while the other mesoporous materials cannot completely eliminate the skin irritation of the peony bark essential oil.

From the examples mentioned above, the peony bark essential oil silica nanoparticles provided by the disclosure are uniform in size, high in coating efficiency, and good in release performance. The peony bark essential oil silica nanoparticles may be applied to the anti-mite product, and can reduce the addition amount of the essential oil in the anti-mite laundry detergent while prolonging the action time of the essential oil.

The above are only preferred implementations of the disclosure. It should be noted that for those of ordinary skill in the art, several improvements and modifications may be made without departing from the principles of the disclosure, and these improvements and modifications should also be considered fall within the scope of protection of the disclosure.

What is claimed is:

1. A preparation method of an anti-mite laundry detergent-product containing peony bark essential oil silica nanoparticles, comprising the following steps:

(1) mixing mesoporous silica, peony bark essential oil, and chloroform to obtain a mixture;

(2) vibrating the mixture with ultrasound and allowing the mixture to stand until the mixture completely dehydrates; and (3) repeating step (1) and step (2) to obtain the peony bark essential oil silica nanoparticles;

(4) mixing the anionic surfactant, the amphoteric surfactant, the non-ionic surfactant, and ½ to ⅚ of the total amount of water at 45-50 °C to obtain a mixture A after cooling to 15-25 °C;

(5) mixing the peony bark essential oil silica nanoparticles, the additives, ⅙ to ½ of the total amount of water, the mixture A, and the amino acid surfactant to obtain a mixture B; and (6) regulating pH of the mixture B to 6-8 to obtain the anti-mite laundry detergent.

2. The preparation method of an anti-mite laundry detergent containing peony bark essential oil silica nanoparticles according to claim 1, wherein in step (1), a solid-liquid ratio of the mesoporous silica to the peony bark essential oil to the chloroform is 90-110 mg:50-150 μL:0.5-2 mL.

3. The preparation method of an anti-mite laundry detergent containing peony bark essential oil silica nanoparticles according to claim 1, wherein a preparation method of the mesoporous silica comprises the following steps:

(1) mixing ethanol, ammonium hydroxide, tetraethyl orthosilicate, and a hexadecyl trimethyl ammonium bromide aqueous solution to obtain a mixed solution;

(2) centrifuging the mixed solution and taking a precipitate to obtain a solid; and (3) calcining the solid to obtain the mesoporous silica.

4. The preparation method of an anti-mite laundry detergent containing peony bark essential oil silica nanoparticles according to claim 3, wherein in step (1), the ethanol is an ethanol aqueous solution with a concentration of 60-80 vt %, and the hexadecyl trimethyl ammonium bromide aqueous solution is prepared by mixing hexadecyl trimethyl ammonium bromide with water in a mass volume ratio of 2-3 g:40-60 mL.

5. The preparation method of an anti-mite laundry detergent product containing peony bark essential oil silica nanoparticles according to claim 3, wherein in step (1), a volume ratio of the ethanol to the ammonium hydroxide to the hexadecyl trimethyl ammonium bromide aqueous solution is 40-60:10-15:40-60; and a mass volume ratio of the tetraethyl orthosilicate to the hexadecyl trimethyl ammonium bromide aqueous solution is 3-4 g: 40-60 mL.

6. The preparation method of an anti-mite laundry detergent containing peony bark essential oil silica nanoparticles according to claim 3, wherein in step (2), a centrifugal speed is 12000-18000 rpm and a centrifugal time is 15-25 min; and in step (3), a calcination temperature is 500-600 °C and a calcination time is 5-7 h.

7. The preparation method of an anti-mite laundry detergent containing peony bark essential oil silica nanoparticles according to claim 1, wherein in step (2), a standing temperature is 20-25 °C; and in step (3), a number of repetitions is 2-4.

8. The preparation method of an anti-mite laundry detergent containing peony bark essential oil silica nanoparticles according to claim 1, wherein the anti-mite laundry detergent comprises the following components in parts by weight:

5-15 parts of the peony bark essential oil silica nanoparticles, 1-3 parts of an amino acid surfactant, 7-10 parts of an anionic surfactant, 3-5 parts of an amphoteric surfactant, 10-20 parts of a non-ionic surfactant, 8-11 parts of additives, and 36-66 parts of water.

9. The preparation method of an anti-mite laundry detergent product containing peony bark essential oil silica nanoparticles according to claim 8, wherein the amino acid surfactant is lauroyl sarcosinate and/or lauroyl glycinate; the anionic surfactant is one or more of sodium alcohol ether sulphate, sodium ethoxylated alkyl sulfate, and lauryl sulfate; the amphoteric surfactant is cocoamidopropyl betaine; the non-ionic surfactant is alkyl glucoside and/or coconut diethanolamide; the additives comprise a thickener, an antifreeze agent, an anti-redeposition agent, a chelating agent, a preservative, and a pH regulator; the thickener is guar gum; the antifreeze agent is propylene glycol; the anti-redeposition agent is polyacrylate; the chelating agent is tetra glutamate diacetate; the pH regulator is sodium citrate; and an addition ratio of the thickener to the antifreeze agent to the anti-redeposition agent to the chelating agent to the preservative to the pH regulator is 0.1-4:0.5-4:0.2-4:0.2-2.4:0.1-0.5:0-3.

* * * * *